United States Patent
Kim et al.

(10) Patent No.: US 12,282,421 B2
(45) Date of Patent: Apr. 22, 2025

(54) METHOD AND APPARATUS FOR MANAGING MEMORY OF STORAGE SYSTEM

(71) Applicant: Samsung Electronics Co., Ltd., Suwon-si (KR)

(72) Inventors: Dohyeon Kim, Suwon-si (KR); Hong Rak Son, Suwon-si (KR); Jae Hun Jang, Suwon-si (KR); Mankeun Seo, Suwon-si (KR); Yong Ho Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/384,646

(22) Filed: Oct. 27, 2023

(65) Prior Publication Data

US 2024/0289267 A1     Aug. 29, 2024

(30) Foreign Application Priority Data

Feb. 28, 2023     (KR) ........................ 10-2023-0027047

(51) Int. Cl.
    *G06F 12/00*     (2006.01)
    *G06F 12/02*     (2006.01)
(52) U.S. Cl.
    CPC ................... *G06F 12/023* (2013.01)
(58) Field of Classification Search
    None
    See application file for complete search history.

(56) References Cited

U.S. PATENT DOCUMENTS

| | | | |
|---|---|---|---|
| 6,885,319 B2 | 4/2005 | Geiger et al. | |
| 7,647,452 B1 | 1/2010 | Moll et al. | |
| 8,495,300 B2 | 7/2013 | Ng et al. | |
| 8,880,781 B2 | 11/2014 | Hong | |
| 9,330,001 B2 | 5/2016 | Arelakis et al. | |
| 2019/0007206 A1* | 1/2019 | Surla ...................... | H04L 63/10 |
| 2022/0197510 A1 | 6/2022 | Lee et al. | |

FOREIGN PATENT DOCUMENTS

| | | | |
|---|---|---|---|
| JP | 2012-164194 A | 8/2012 |
| JP | 6359980 B2 | 7/2018 |

* cited by examiner

*Primary Examiner* — Midys Rojas
(74) *Attorney, Agent, or Firm* — Sughrue Mion, PLLC

(57) ABSTRACT

The present disclosure provides method and apparatuses for managing memory of storage system. In some embodiments, a controller of a storage system includes a memory storing a program, and a processor configured to execute the program to determine whether a type of data stored in the memory is at least one of a first data type and a second data type, store, in the memory, a header of the data stored in the memory, based on a first determination that the data stored in the memory is of the first data type, compress the data stored in the memory, based on a second determination that data stored in the memory is of the second data type, and power off the memory based on at least one of the header of the data and the compressed data having been stored in the memory.

20 Claims, 8 Drawing Sheets

METHOD AND APPARATUS FOR MANAGING MEMORY OF STORAGE SYSTEM

CROSS-REFERENCE TO RELATED APPLICATIONS

This application claims benefit of priority under 35 U.S.C. § 119 to Korean Patent Application No. 10-2023-0027047, filed on Feb. 28, 2023, in the Korean Intellectual Property Office, the disclosure of which is incorporated by reference herein in its entirety.

BACKGROUND

1. Field

The present disclosure relates generally to memory storage systems, and more particularly, to a method and apparatus for managing a memory of a storage system.

2. Related Art

A tightly-coupled memory (TCM) may refer to a memory that may be accessed quickly by a processor and that has access times that may be guaranteed to not exceed a certain threshold. Although the processor may be able access a related cache memory more quickly than a TCM, the related cache memory may not have a guaranteed access time. For example, the processor may need to access the related cache memory multiple times when a cache miss occurs. As a result, access times of the related cache memory may increase, as well as, may vary greatly from one memory access operation to another. Therefore, a cache memory may be difficult to use in a real-time system, for example, in which access times may need to be guaranteed to not exceed a certain threshold. In such scenarios, a TCM that may be capable of guaranteeing access times of a processor may be used. Alternatively or additionally, a TCM may be applicable in other scenarios in which guaranteed access times may be advantageous.

SUMMARY

Aspects of the present disclosure provide for a controller of a storage system. Additional or optional aspects of the present disclosure further provide for a method for managing a memory of a controller.

According to an aspect of the present disclosure, a controller of a storage system is provided. The controller includes a memory storing a program, and a processor communicatively coupled to the memory. The processor is configured to execute the program to determine whether a type of data stored in the memory is at least one of a first data type and a second data type. The processor is configured to further execute the program to store, in the memory, a header of the data stored in the memory, based on a first determination that the data stored in the memory is of the first data type. The processor is configured to further execute the program to compress the data stored in the memory, based on a second determination that data stored in the memory is of the second data type. The processor is configured to further execute the program to power off the memory based on at least one of the header of the data and the compressed data having been stored in the memory.

In some embodiments, the first data type may correspond to instruction-tightly-coupled memory (I-TCM) data, and the second data type may correspond to data-tightly-coupled memory (D-TCM) data. In such embodiments, the processor may be configured to further execute the program to determine whether the type of the data stored in the memory is at least one of I-TCM data and D-TCM data.

In some embodiments, the I-TCM data may include software code of the processor, and the D-TCM data may include data generated by an operation of the controller.

In some embodiments, the processor may be configured to further execute the program to store, in the memory, the header of the data, based on the first determination that the data stored in the memory corresponds to the I-TCM data.

In some embodiments, the processor may be configured to further execute the program to compress the data stored in the memory and store the compressed data in the memory, based on the second determination that the data stored in the memory corresponds to the D-TCM data.

In some embodiments, the processor may be configured to further execute the program to power off a remaining portion of the memory that may exclude a used portion of the memory in which at least one of the header of the data and the compressed data may be stored.

In some embodiments, the header may include a flash memory address of the data and a size of the data.

In some embodiments, the processor may be configured to further execute the program to determine whether the type of data stored in the memory is at least one of the first data type and the second data type, based on the storage system entering a sleep mode.

In some embodiments, the processor may be configured to further execute the program to load I-TCM data from a flash memory of the storage system, according to the header of the data, based on the storage system transitioning from the sleep mode to a wake-up mode.

In some embodiments, the processor may be configured to further execute the program to restore D-TCM data from the flash memory concurrently with the loading of the I-TCM data by decompressing compressed D-TCM data.

According to an aspect of the present disclosure, a controller of a storage system is provided. The controller includes a memory storing a program, and a processor communicatively coupled to the memory. The processor is configured to execute the program to power on the memory, based on the storage system entering a wake-up mode. The processor is configured to further execute the program to restoring I-TCM data by using a header of the I-TCM data stored in the memory. The processor is configured to further execute the program to control the storage system by using the I-TCM data.

In some embodiments, the processor may be further configured to execute the program to restore data-tightly-coupled memory (D-TCM) data by decompressing compressed D-TCM data stored in the memory.

In some embodiments, the header of the I-TCM data may include a flash memory address of the I-TCM data and a size of the I-TCM data.

In some embodiments, the processor may be further configured to execute the program to load the I-TCM data stored in the flash memory address from a flash memory of the storage system, according to the header of the I-TCM data.

According to an aspect of the present disclosure, a method for managing a memory of a controller is provided. The method includes determining that data stored in the memory includes I-TCM data and D-TCM data. The method further includes storing, in the memory, at least one header of the I-TCM data. The method further includes compressing the D-TCM data and storing, in the memory, the compressed D-TCM data. The method further includes powering off the memory based on the at least one header of the I-TCM data and the compressed D-TCM data having been stored in the memory.

In some embodiments, the I-TCM data may include software code of a processor, and the D-TCM data may include data generated by an operation of the controller.

In some embodiments, the powering off of the memory may include powering off a remaining portion of the memory that may exclude a used portion of the memory storing the at least one header of the I-TCM data and the compressed D-TCM data.

In some embodiments, the at least one header may include a flash memory address of the I-TCM data and a size of the I-TCM data.

In some embodiments, the determining that the data stored in the memory includes I-TCM data and D-TCM data may include determining that the data includes the I-TCM data and the D-TCM data, based on a storage system controlled by the controller entering a sleep mode.

In some embodiments, the method may further include loading the I-TCM data from a flash memory in the storage system according to the at least one header of the I-TCM data, based on the storage system transitioning from the sleep mode to a wake-up mode.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION OF THE EMBODIMENTS

Figure 1:
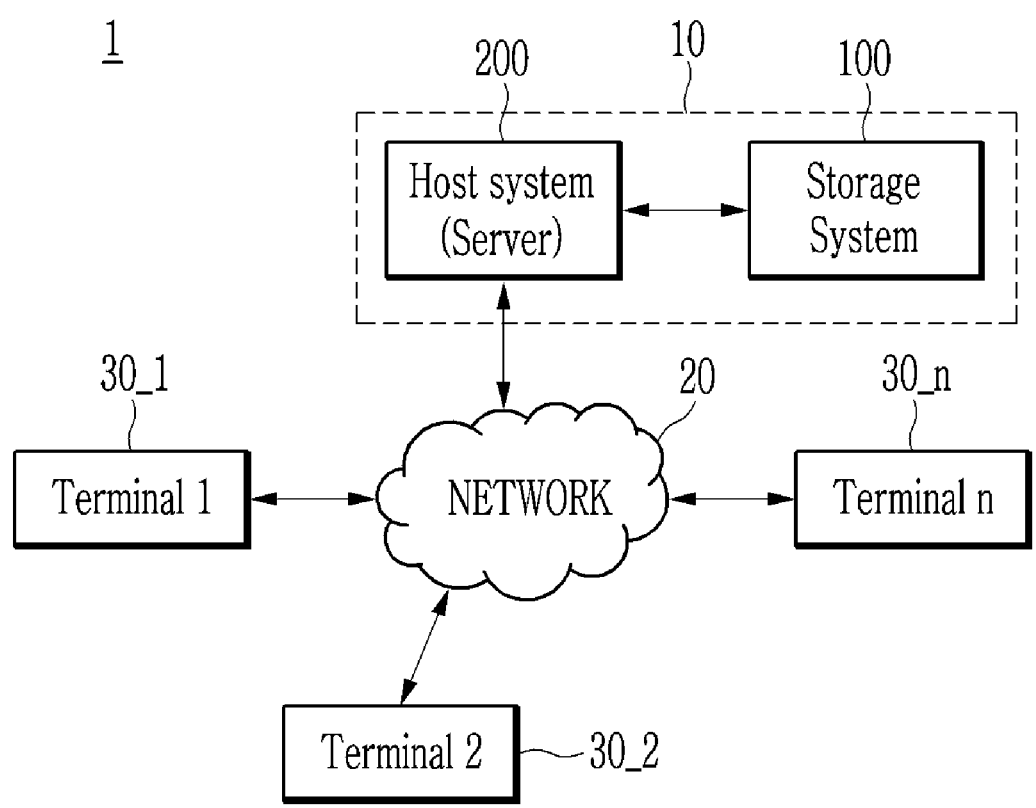
FIG. 1 is a block diagram showing a network system, according to an embodiment.

In the following detailed description, only certain embodiments of the present invention have been shown and described, by way of illustration. Those of ordinary skill in the art may recognize that various changes and modifications of the embodiments described herein may be made without departing from the scope and spirit of the disclosure. Accordingly, the drawings and description are to be regarded as illustrative in nature and not restrictive. Alternatively or additionally, similar reference numerals may designate similar elements throughout the disclosure. In the flowcharts described with reference to the drawings in this disclosure, the operation order may be changed, various operations may be merged, certain operations may be divided, and/or certain operations may not be performed.

In addition, a singular form may be intended to include a plural form as well, unless an explicit expression such as "one" or "single" is used. Terms including ordinal numbers such as first, second, and the like may be used only to describe various constituent elements, and may not be interpreted as limiting these constituent elements. That is, these terms may be used for distinguishing one constituent element from other constituent elements, and does not limit the elements in other aspects (e.g., importance or order).

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Hereinafter, various embodiments of the present disclosure are described with reference to the accompanying drawings.

FIG. 1 is a block diagram showing a network system, according to an embodiment.

Referring to FIG. 1, a network system 1, according to an embodiment, may include a computing device 10 and a plurality of terminals (e.g., first terminal 30_1, second terminal 30_2, . . . , n-th terminal 30_n, where n is a positive integer greater than zero (0), and may generally referred to herein as "a plurality of terminals 30"). Each terminal of the plurality of terminals 30 may represent, be incorporated into, and/or include a desktop computer, a personal computer (PC), a computer server, a virtual machine, a network appliance, a user equipment (UE), a mobile device (e.g., laptop computer, tablet computer, personal digital assistant (PDA), smart phone, any other type of mobile computing device), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device. In some embodiments, the plurality of terminals 30 may be and/or may include a homogenous set of terminals. That is, each of the terminals in the plurality of terminals 30 may be of a substantially similar and/or the same type. Alternatively or additionally, the plurality of terminals 30 may be and/or may include a heterogeneous set of terminals. That is, the plurality of terminals 30 may be and/or may include terminals of various distinct and/or different types.

The plurality of terminals 30 may communicate with each other through a network 20. Alternatively or additionally, each terminal of the plurality of terminals 30 may communicate with the computing device 10 through the network 20. In some embodiments, a terminal 30 may access the network 20 through another terminal of the plurality of terminals 30.

In an embodiment, the computing device 10 may be and/or may include a data processing system. For example, the computing device 10 may represent, be incorporated into, and/or include a desktop computer, a PC, a computer server, a virtual machine, a network appliance, a processor, a printed circuit board (PCB) including a computing device, a mini-computer, a mainframe computer, a microcomputer, a telephonic computing device, a wired/wireless computing device (e.g., a smartphone, a PDA, a wearable device), or the like.

As shown in FIG. 1, the computing device 10 may include a host system 200 and a storage system 100. In an embodiment, the host system 200 may function as a server. That is, the host system 200 may be configured to perform operations that may be typically associated with the operation of a server, such as, but not limited to, providing a centralized storage location and functionality. In an optional or additional embodiment, the storage system 100 may be and/or may include a flash memory device (e.g., a NAND flash memory device). The flash memory device, according to an embodiment, may include a solid state drive (SSD). However, the present disclosure is not limited in this regard, and the storage system 100 may include other types of memory, such as, but not limited to, a hard disc drive (HDD), various types of volatile memory (e.g., random-access memory (RAM)), various types of non-volatile memory (e.g., read-only memory (ROM)), and the like.

In an embodiment, the host system 200 may process requests transmitted from the plurality of terminals 30 that may be connected (e.g., communicatively coupled) through the network 20. In an optional or additional embodiment, the host system 200 may store data provided (e.g., received) from at least one terminal of the plurality of terminals 30 into the storage system 100. For example, the host system 200 may store the provided data in response to a command received from the at least one terminal 30. Alternatively or additionally, the host system 200 may transfer data stored in the storage system 100 to at least one terminal of the plurality of terminals 30. For example, the host system 200 may provide the transferred data to the at least one terminal 30 in response to a request for the transferred data.

Figure 2:
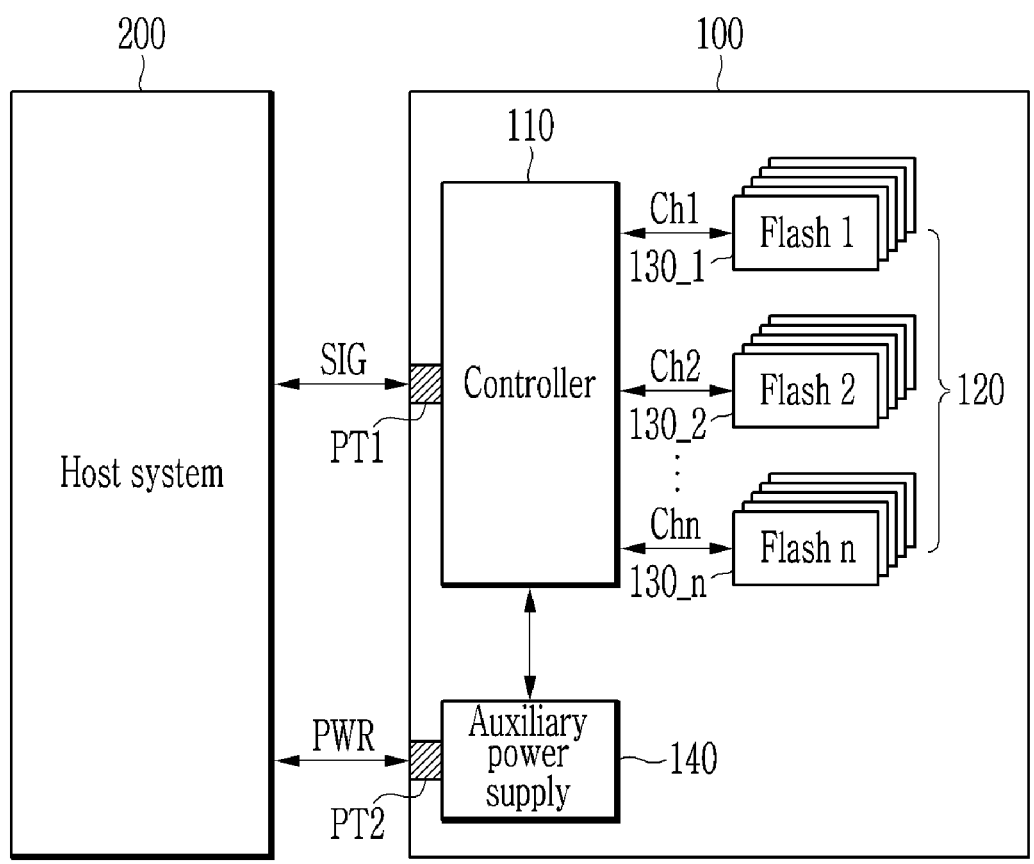
FIG. 2 is a block diagram showing a computing device, according to an embodiment.

FIG. 2 is a block diagram showing a computing device, according to an embodiment.

Referring to FIG. 2, the computing device 10 may include the host system 200 and the storage system 100. The host system 200 and the storage system 100 may communicate with each other through an interface. For example, the host system 200 and the storage system 100 may exchange signals SIG and/or power PWR through the interface. In an embodiment, the storage system 100 may be and/or may include an SSD. Alternatively or additionally, the storage system 100 may include a controller 110 and at least one memory device 120.

In an embodiment, the controller 110 may control the memory device 120 in response to a signal SIG received from the host system 200 through a first port PT1 of the storage system 100. The controller 110 may be connected to the memory device 120 through a plurality of channels (e.g., first channel Ch1 130_1, second channel Ch2 130_2, . . . , n-th channel Chn 130_$n$, where n is a positive integer greater than zero (0), and may generally referred to herein as "a plurality of channels 130"). In an optional or additional embodiment, the controller 110 may be connected to a plurality of flash memories (e.g., flash 1, flash 2, . . . , n-th flash n) of the memory device 120 through the plurality of channels 130. For example, each channel of the plurality of channels 130 may correspond to a flash memory 120 and/or may correspond to a group of flash memories 120. That is, the controller 110 may control a flash memory 120 and/or a group of flash memories 120 through each channel of the plurality of channels 130.

In an optional or additional embodiment, the storage system 100 may generate a result of processing a service request from the host system 200. Alternatively or additionally, the storage system 100 may output the result (e.g., a signal SIG) to the host system 200 through the first port PT1.

As shown in FIG. 2, the storage system 100 may further include an auxiliary power supply 140. In an embodiment, the auxiliary power supply 140 may be supplied with power PWR from the host system 200 through a second port PT2. Alternatively or additionally, the storage system 100 may be supplied with power from external devices (not shown) other than the host system 200. In such embodiments, the storage system 100 may be supplied with power through the second port PT2 and/or another port (not shown).

In response to a request from the host system 200, the controller 110 may control a memory operation of the memory device 120 by providing at least one signal to the memory device 120. The at least one signal may include an instruction and/or an address. However, the present disclosure is not limited in this regard, and the at least one signal may include other types of information that may be needed to operate the memory device 120. For example, the controller 110 may read data stored in the memory device 120 by providing and/or receiving at least one read signal to and/or from the memory device 120. Alternatively or additionally, the controller 110 may write data to the memory device 120 by providing and/or receiving at least one write signal to and/or from the memory device 120.

In an embodiment, the memory device 120 may be and/or include volatile memory such as, but not limited to, dynamic random-access memory (DRAM). In an optional or additional embodiment, the memory device 120 may be and/or include non-volatile memory (NVM) such as, but not limited to, flash memory, phase-change memory (e.g., phase-change random-access memory (PRAM)), resistive memory (e.g., resistive random-access memory (RRAM)), magnetoresistive memory (e.g., magnetoresistive random-access memory (MRAM)), ferroelectric memory (e.g., ferroelectric random-access memory (FRAM)), and polymer memory.

In an embodiment, when the storage system 100 includes an SSD, the storage system 100 may include a device complying with one or more NVM express (NVMe) standards (e.g., NVMe, Peripheral Component Interconnect (PCI), PCI Express (PCIe), NVMe over Fabrics, and the like). In an optional or additional embodiment, when the storage system 100 includes an embedded memory and/or an external memory, the storage system 100 may include a device complying with at least one of the universal flash storage (UFS) standard, the embedded multi-media card (eMMC) standard, and the like. That is, the host 200 and the storage system 100 may generate and/or transmit signals according to one or more adopted storage protocol standards.

In an embodiment, the memory device 120 may be used as a system memory of the host system 200. In such an embodiment, the controller 110 may be provided as a separate chip from the processor of the host system 200. Alternatively or additionally, the controller 110 may be provided as an internal component of the processor of the host system 200. In an optional or additional embodiment, the storage system 100 may be used as a storage device of the host system 200.

Figure 3:
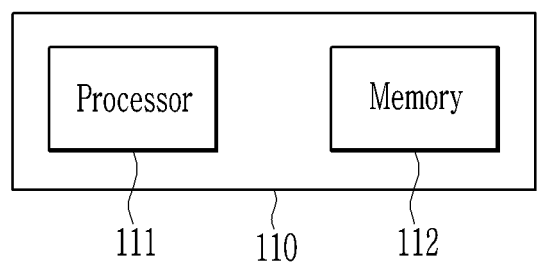
FIG. 3 is a block diagram showing a controller of a storage system, according to an embodiment.

FIG. 3 is a block diagram showing a controller of a storage system, according to an embodiment.

Referring to FIG. 3, the controller 110 of the storage system 100 may include a processor 111 and a memory 112. The memory 112 may be connected (e.g., communicatively coupled) to the processor 111. Alternatively or additionally, the memory 112 may store various information for operating the processor 111 such as, but not limited to, at least one program that may be executable by the processor 111.

The processor 111 may be configured to implement functions, processes, and/or methods according to the embodiments described herein. That is, operations of the controller 110, according to an embodiment, may be implemented by the processor 111.

In an embodiment, the memory 112 may be located inside and/or outside of the processor 111. Alternatively or additionally, the memory 112 may be connected (e.g., coupled) to the processor 111 through various known interfaces. The memory 112 may be and/or may include a volatile storage medium and/or a non-volatile storage medium that may be implemented in various forms, such as, but not limited to, a ROM, a RAM, and the like.

In an embodiment, when the storage system 100 performs a start-up procedure, for example, the processor 111 of the controller 110 may read data necessary for the operation of the start-up procedure by the storage system 100 from the memory device 120. Alternatively or additionally, the processor 111 may store the read data (e.g., start-up procedure data) in the memory 112. The memory 112 may be and/or may include a tightly-coupled memory (TCM). In an embodiment, the TCM may include at least one static RAM (SRAM). However, the present disclosure is not limited in this regard, and the TCM may be and/or may include other types of memory.

When the storage system 100 is in a sleep (e.g., inactive, idle) and/or power conservation mode, the controller 110 may power off at least a portion of the memory 112 in order to reduce power consumption of the storage system 100. In such a mode, when the memory 112 includes a TCM, the processor 111 of the controller 110 may reduce the size of the data stored in at least one SRAM of the TCM. Alternatively or additionally, the processor 111 may power off a portion of the SRAM that is not being used to store data.

In an embodiment, the TCM of the memory 112 may be partitioned into instruction-TCM (I-TCM) and/or data-TCM (D-TCM). However, the present disclosure is not limited in this regard, and the TCM may be partitioned into fewer or more partition types without departing from the scope of the present disclosure.

In an embodiment, the I-TCM may store data that may be changed (e.g., modified, re-written) infrequently. For example, software codes and/or instruction sets for operating the controller 110 of the storage system 100 may be stored in the I-TCM. In an optional or additional embodiment, the processor of the controller 110 may only perform a finite set of predetermined operations according to the operating mode, and as such, data stored in the I-TCM may be unlikely to change.

In an optional or additional embodiment, the D-TCM may store data that may be changed more frequently when compared to the data stored in the I-TCM. For example, data that may be used by software (e.g., program code, executable code) for operating the processor (e.g., data generated by an operation of the controller 110) may be stored in the D-TCM. The data stored in the D-TCM (e.g., data used by the operation of the software) is likely to change over time, and as such, a randomness of the frequency of memory access may be higher when compared to the data stored in the I-TCM.

Figure 4:
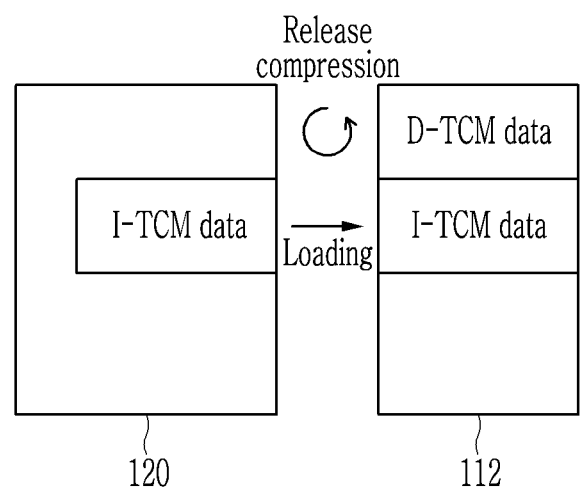
FIG. 4 is a drawing showing data stored in a memory of a storage system, according to an embodiment.

FIG. 4 is a drawing showing data stored in the memory of the storage system, according to an embodiment.

In an embodiment, the processor 111 of the controller 110 may read data (e.g., instructions and/or software codes) from a memory device 120 for operation of the controller 110. The data loaded from the memory device 120 may be stored in the I-TCM of the TCM (e.g., I-TCM data).

Alternatively or additionally, the processor 111 may decompress the D-TCM data compressed in the memory 112. The data compressed in the D-TCM may be data used and/or generated by software codes at the time of previous operation of the storage system 100.

In an embodiment, the processor 111 may implement the operation of the controller 110 by using the I-TCM data and the decompressed D-TCM data.

Figure 5:
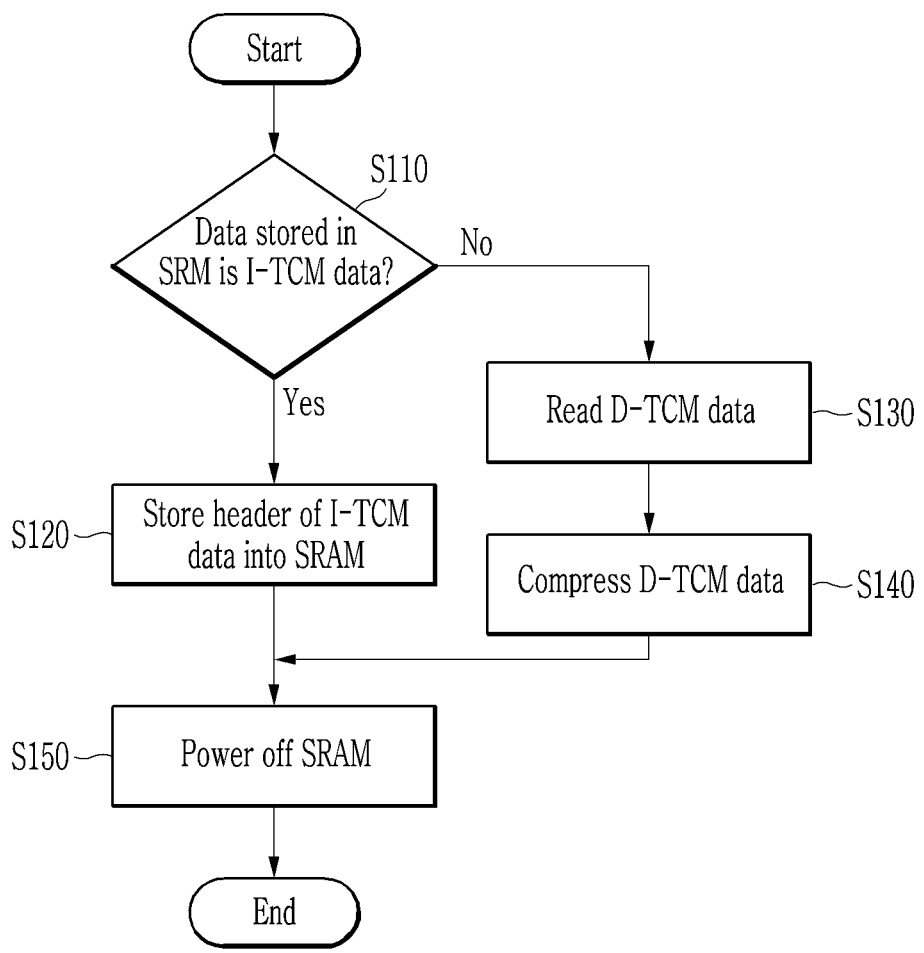
FIG. 5 is a flowchart showing a method for managing a memory of a storage system, according to an embodiment.

FIG. 5 is a flowchart showing a method for managing the memory of the storage system, according to an embodiment.

Figure 6:
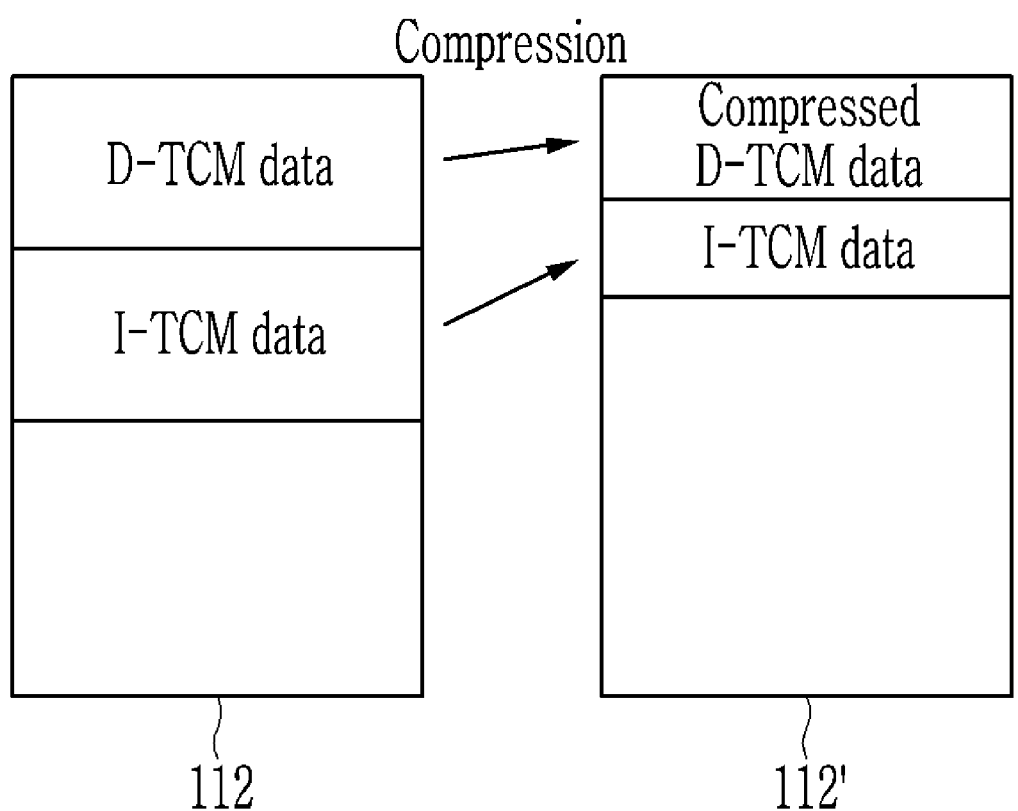
FIG. 6 is a drawing showing a change of data stored in a memory, according to an embodiment.

FIG. 6 is a drawing showing a change of data stored in the memory, according to an embodiment.

When the storage system 100 enters the sleep mode, the processor 111 of the controller 110 may process the data stored in the SRAM of the memory device 120 in different ways, according to the types of data stored in the memory device 120, before turning off the TCM. Referring to FIG. 5, at operation S110, the processor 111 may determine (e.g., identify) the type of data stored in the SRAM, and reduce the size of data in different ways according to the data type.

In an embodiment, if a header is added to the data, the processor 111 may determine that the corresponding type data is the I-TCM data. For example, the header may include a flash memory address (e.g., a NAND address) of the I-TCM data and/or a size of the I-TCM data. In an optional or additional embodiment, the processor 111 may determine that data to which the header has been added is I-TCM data. Alternatively or additionally, the processor 111 may determined that data to which the header has not added is D-TCM data. However, the present disclosure is not limited in this regard, and the processor 111 may use other methods to identify the I-TCM and the D-TCM stored in the memory device 120.

In an embodiment, the processor 111 may (e.g., identify) the type of data sequentially as recorded (e.g., stored) in the SRAM of the memory device 120. For example, since positions of the I-TCM and the D-TCM in the TCM may vary, the processor 111 may determine the D-TCM data after having determined the I-TCM data. Alternatively or additionally, the processor 111 may determine the I-TCM data after having determined the D-TCM data. In an optional or additional embodiment, the processor 111 may determine that all remaining undetermined data is D-TCM data, after having determined the I-TCM data.

As shown in FIGS. 5 and 6, when the data stored in the SRAM of the memory device 120 is the I-TCM data 112, the processor 111 may store the header of the I-TCM data 112' in the SRAM, at operation S120. For example, the header of the I-TCM data 112' may include the flash memory address and/or the size of the I-TCM data. Thereafter, the processor 111 may read the I-TCM data from the memory device 120, indicated by the stored header 112' after powering on the SRAM.

Continuing to refer to FIGS. 5 and 6, when the data stored in the SRAM of the memory device 120 is the D-TCM data 112, the processor 111 may read the D-TCM data 112 at operation S130. Alternatively or additionally, the processor 111 may compress the D-TCM data 112 and store the compressed D-TCM data 112' in the SRAM at operation S140. In an embodiment, the processor 111 may decompress and use the decompressed D-TCM data 112 after powering on the SRAM.

When the header of the I-TCM data 112' and the compressed data of the D-TCM data 112' are stored in the SRAM, the processor 111 may power off a remaining portion that does not store the header of the I-TCM data 112' and the compressed D-TCM data 112', at operation S150.

As described above with reference to FIGS. 5 and 6, the processor 111 of the controller 110 may reduce the size of data stored in the memory 112 in different ways according to the data type. Alternatively or additionally, the processor 111 may reduce power consumption of the storage system 100 by powering off the portion of the memory 112 that does not store the data.

Figure 7:
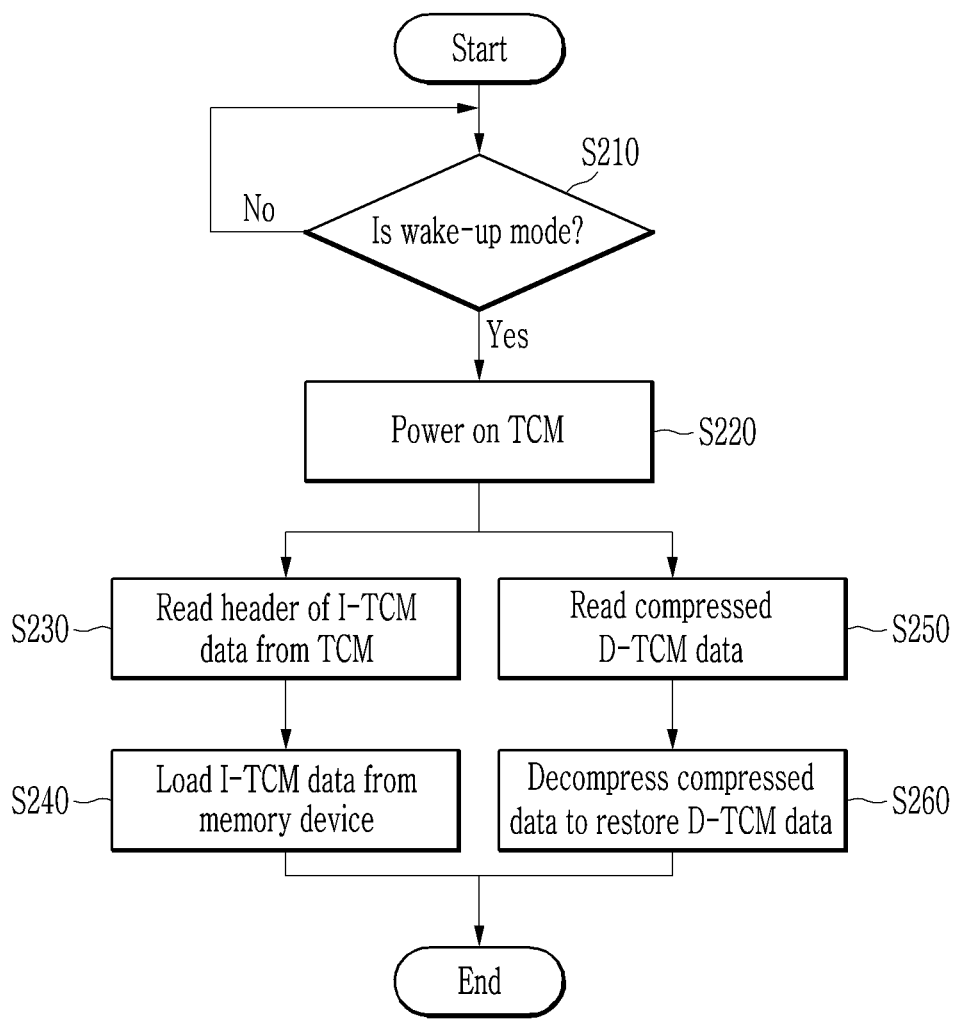
FIG. 7 is a flowchart showing a method for managing a memory of a storage system, according to an embodiment.
Figure 8:
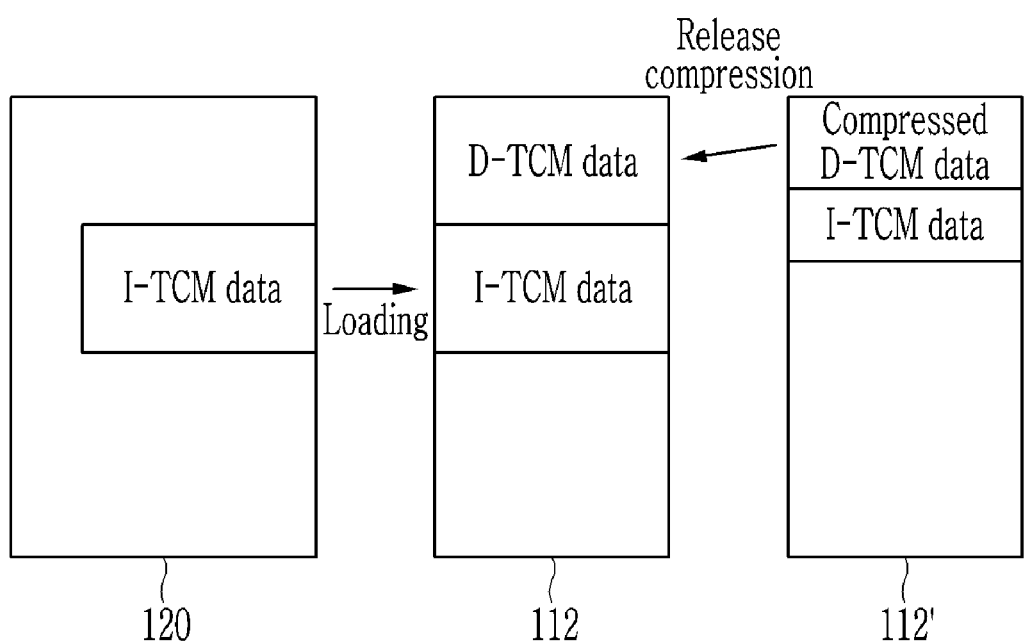
FIG. 8 is a drawing showing a change of data stored in a memory, according to an embodiment.

FIG. 7 is a flowchart showing a method for managing the memory of the storage system, according to an embodiment. FIG. 8 is a drawing showing a change of data stored in the memory, according to an embodiment.

In an embodiment, when the storage system 100 enters a wake-up mode, the processor 111 of the controller 110 may power on the TCM of the memory device 120 and restore the data for the operation of the processor 111.

Referring to FIG. 7, the processor 111 may confirm, at operation S210, that the storage system 100 has entered the wake-up mode, and may power on the TCM, at operation S220.

Referring to FIGS. 7 and 8, at operation S230, the processor 111 may check the memory address of the I-TCM data 112 by reading the header of the I-TCM data 112' stored in the TCM. At operation S240, the processor 111 may load the I-TCM data from the TCM. For example, the header of the I-TCM data 112' may include the flash memory address and/or a size of the I-TCM data within the TCM memory of the I-TCM data. In an embodiment, the processor 111 may load the I-TCM data stored in the TCM memory address to restore the I-TCM data 112.

At operation S250, the processor 111 may read the compressed data of the D-TCM data 112' stored in the TCM. Alternatively or additionally, the processor 111 may decompress the compressed data to restore the D-TCM data 112, at operation S260. In an embodiment, the processor 111 may concurrently restore the I-TCM data 112 and the D-TCM data 112.

In an optional or additional embodiment, the processor 111 may control the storage system 100 by using the restored I-TCM data and the D-TCM data.

As described above with reference to FIGS. 7 and 8, when the storage system 100 is in the wake-up mode, since the processor 111 of the controller 110 may quickly restore the I-TCM data and the D-TCM data based on the header of the I-TCM data and the compressed D-TCM data stored in the memory 112, power consumption of the TCM and/or the SRAM may be reduced without affecting the performance of the controller 110.

In some embodiments, each constituent element, module, and/or unit represented as a block in FIG. 1 to FIG. 8 may be implemented as a variable number of hardware, software, and/or firmware structures that execute each function described above, depending on the embodiment. For example, at least one constituent element, module, or unit may include various hardware constituent elements including a digital circuit, a programmable or non-programmable logic device or an array, an application specific integrated circuit (ASIC), or other circuits that use digital circuit structures such as, but not limited to, a memory, a processor, a logic circuit, and a look-up table, which may execute each function under the control of one or more microprocessors or other control devices. Alternatively or additionally, at least one constituent element, module, and/or unit may include one or more executable instruction words for performing a specific logic function, and/or may be executed by one or more microprocessors or other control devices. Alternatively or additionally, at least one constituent element, module, and/or unit may include a processor (e.g., a CPU or microprocessor) that may perform each function, and/or may be implemented by a processor. Functional features of some embodiments may be implemented as an algorithm running on one or more processors.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A controller of a storage system, comprising:
a memory storing a program; and
a processor communicatively coupled to the memory, wherein the processor is configured to execute the program to:
determine whether a type of data stored in the memory is at least one of a first data type and a second data type;
store, in the memory, a header of the data stored in the memory, based on a first determination that the data stored in the memory is of the first data type;
compress the data stored in the memory, based on a second determination that data stored in the memory is of the second data type; and
power off the memory based on at least one of the header of the data and the compressed data having been stored in the memory.

2. The controller of claim 1, wherein:
the first data type corresponds to instruction-tightly-coupled memory (I-TCM) data,
the second data type corresponds to data-tightly-coupled memory (D-TCM) data, and
the processor is further configured to execute the program to determine whether the type of the data stored in the memory is at least one of I-TCM data and D-TCM data.

3. The controller of claim 2, wherein:
the I-TCM data comprises software code of the processor, and
the D-TCM data comprises data generated by an operation of the controller.

4. The controller of claim 2, wherein the processor is further configured to execute the program to:
store, in the memory, the header of the data, based on the first determination that the data stored in the memory corresponds to the I-TCM data.

5. The controller of claim 2, wherein the processor is further configured to execute the program to:

compress the data stored in the memory and store the compressed data in the memory, based on the second determination that the data stored in the memory corresponds to the D-TCM data.

6. The controller of claim 2, wherein the processor is further configured to execute the program to:
power off a remaining portion of the memory that excludes a used portion of the memory in which at least one of the header of the data and the compressed data are stored.

7. The controller of claim 6, wherein the header comprises a flash memory address of the data and a size of the data.

8. The controller of claim 1, wherein, the processor is further configured to execute the program to:
determine whether the type of data stored in the memory is at least one of the first data type and the second data type, based on the storage system entering a sleep mode.

9. The controller of claim 8, wherein the processor is further configured to execute the program to:
load instruction-tightly-coupled memory (I-TCM) data from a flash memory of the storage system, according to the header of the data, based on the storage system transitioning from the sleep mode to a wake-up mode.

10. The controller of claim 9, wherein the processor is further configured to execute the program to:
restore data-tightly-coupled memory (D-TCM) data from the flash memory concurrently with the loading of the I-TCM data by decompressing compressed D-TCM data.

11. A controller of a storage system, comprising:
a memory storing a program; and
a processor communicatively coupled to the memory, wherein the processor is configured to execute the program to:
power on the memory, based on the storage system entering a wake-up mode;
restoring instruction-tightly-coupled memory (I-TCM) data by using a header of the I-TCM data stored in the memory; and
control the storage system by using the I-TCM data.

12. The controller of claim 11, wherein the processor is further configured to execute the program to:
restore data-tightly-coupled memory (D-TCM) data by decompressing compressed D-TCM data stored in the memory.

13. The controller of claim 11, wherein the header of the I-TCM data comprises a flash memory address of the I-TCM data and a size of the I-TCM data.

14. The controller of claim 13, wherein the processor is further configured to execute the program to:
load the I-TCM data stored in the flash memory address from a flash memory of the storage system, according to the header of the I-TCM data.

15. A method for managing a memory of a controller, comprising:
determining that data stored in the memory comprises instruction-tightly-coupled memory (I-TCM) data and data-tightly-coupled memory (D-TCM) data;
storing, in the memory, at least one header of the I-TCM data;
compressing the D-TCM data and storing, in the memory, the compressed D-TCM data; and
powering off the memory based on the at least one header of the I-TCM data and the compressed D-TCM data having been stored in the memory.

16. The method of claim 15, wherein:
the I-TCM data comprises software code of a processor, and
the D-TCM data comprises data generated by an operation of the controller.

17. The method of claim 15, wherein the powering off of the memory comprises
powering off a remaining portion of the memory that excludes a used portion of the memory storing the at least one header of the I-TCM data and the compressed D-TCM data.

18. The method of claim 15, wherein the at least one header comprises a flash memory address of the I-TCM data and a size of the I-TCM data.

19. The method of claim 15, wherein the determining that the data stored in the memory comprises I-TCM data and D-TCM data comprises:
determining that the data comprises the I-TCM data and the D-TCM data, based on a storage system controlled by the controller entering a sleep mode.

20. The method of claim 19, further comprising:
loading the I-TCM data from a flash memory in the storage system according to the at least one header of the I-TCM data, based on the storage system transitioning from the sleep mode to a wake-up mode.

* * * * *